United States Patent
Kusakabe et al.

(10) Patent No.: US 10,731,594 B2
(45) Date of Patent: Aug. 4, 2020

(54) CONTROL DEVICE FOR FUEL INJECTION DEVICE

(71) Applicant: Hitachi Automotive Systems, Ltd., Hitachinaka-shi, Ibaraki (JP)

(72) Inventors: Ryo Kusakabe, Tokyo (JP); Masayuki Saruwatari, Tokyo (JP); Noriyuki Maekawa, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/343,632

(22) PCT Filed: Nov. 1, 2017

(86) PCT No.: PCT/JP2017/039481
§ 371 (c)(1),
(2) Date: Apr. 19, 2019

(87) PCT Pub. No.: WO2018/088287
PCT Pub. Date: May 17, 2018

(65) Prior Publication Data
US 2019/0331055 A1 Oct. 31, 2019

(30) Foreign Application Priority Data
Nov. 14, 2016 (JP) ................. 2016-221164

(51) Int. Cl.
*F02D 41/40* (2006.01)
*B05B 1/30* (2006.01)
(Continued)

(52) U.S. Cl.
CPC ............. *F02D 41/40* (2013.01); *B05B 1/304* (2013.01); *B05B 12/085* (2013.01); *F02B 75/02* (2013.01);
(Continued)

(58) Field of Classification Search
CPC .......... F02D 41/40; F02D 41/30; F02D 41/20; F02D 2041/2051; F02D 2041/2013;
(Continued)

(56) References Cited

U.S. PATENT DOCUMENTS

2012/0318883 A1* 12/2012 Kusakabe ............... F02D 41/20
239/1
2013/0139791 A1* 6/2013 Kusakabe .............. F02M 69/04
123/478
(Continued)

FOREIGN PATENT DOCUMENTS

JP 2012-52419 A 3/2012
JP 2014-92080 A 5/2014
(Continued)

OTHER PUBLICATIONS

International Search Report (PCT/ISA/210) issued in PCT Application No. PCT/JP2017/039481 dated Mar. 6, 2018 with English translation (four (4) pages).
(Continued)

*Primary Examiner* — Xiao En Mo
(74) *Attorney, Agent, or Firm* — Crowell & Moring LLP

(57) ABSTRACT

Provided is a control device of a fuel injection device which can stabilize a behavior of a valve even when a voltage of a voltage source varies, and can reduce a deviation of an injection amount. The fuel injection device includes a valve and a coil which generates a magnetic attraction force to attract a movable element which drives the valve. A control device applies a predetermined voltage to the coil on the basis of an injection pulse, causes a drive current to flow to the coil until the drive current reaches a maximum current, drives the valve by attracting the movable element, and injects fuel. The drive current flowing to the coil is lowered from the maximum current before the valve reaches a desired maximum lift position, and a constant voltage lower (Continued)

than a predetermined voltage or 0 V is continuously applied to the coil until the valve reaches the desired maximum lift position.

10 Claims, 7 Drawing Sheets

(51) Int. Cl.
| | | |
|---|---|---|
| *B05B 12/08* | (2006.01) | |
| *F02B 75/02* | (2006.01) | |
| *F02D 41/20* | (2006.01) | |
| *F02D 41/30* | (2006.01) | |
| *F02M 51/06* | (2006.01) | |
| *F02M 61/10* | (2006.01) | |

(52) U.S. Cl.
CPC ............. *F02D 41/20* (2013.01); *F02D 41/30* (2013.01); *F02M 51/061* (2013.01); *F02B 2075/027* (2013.01); *F02D 2041/2003* (2013.01); *F02D 2041/2013* (2013.01); *F02D 2041/2051* (2013.01); *F02M 61/10* (2013.01)

(58) Field of Classification Search
CPC .. F02D 2041/2003; F02D 45/00; F02D 41/36; F02D 2041/2037; F02M 51/061; F02M 61/10; F02M 51/0685; F02M 51/00; F02M 51/066; F02B 75/02; F02B 2075/027; B05B 12/085; B05B 1/304
See application file for complete search history.

(56) References Cited

U.S. PATENT DOCUMENTS

| | | | |
|---|---|---|---|
| 2014/0124601 A1* | 5/2014 | Imai | ...................... F02D 41/20 |
| | | | 239/585.1 |
| 2014/0124602 A1* | 5/2014 | Imai | ..................... F02M 51/061 |
| | | | 239/585.1 |
| 2014/0238354 A1 | 8/2014 | Imai | |
| 2017/0218876 A1 | 8/2017 | Kusakabe et al. | |
| 2018/0156147 A1* | 6/2018 | Shi | ....................... F02D 41/247 |
| 2018/0245534 A1* | 8/2018 | Imai | ....................... F02D 41/20 |

FOREIGN PATENT DOCUMENTS

| | | |
|---|---|---|
| JP | 2014-98375 A | 5/2014 |
| JP | 2014-163278 A | 9/2014 |
| JP | 2015-206371 A | 11/2015 |
| JP | 2015-224621 A | 12/2015 |
| WO | WO 2016/136392 A1 | 9/2016 |
| WO | WO 2016/136394 A1 | 9/2016 |

OTHER PUBLICATIONS

Japanese-language Written Opinion (PCT/ISA/237) issued in PCT Application No. PCT/JP2017/039481 dated Mar. 6, 2018 (four (4) pages).

* cited by examiner

CONTROL DEVICE FOR FUEL INJECTION DEVICE

TECHNICAL FIELD

The present invention relates to a control device which controls a fuel injection device of an internal combustion engine.

BACKGROUND ART

In recent years, there is a request for a fuel injection device an engine is required to suppress a total amount of particulate matters (PM) in an engine during a mode travel and the particulate number (PN) which is the number of particulate matters as exhaust regulations are reinforced, and can control a minute injection amount. As a method of suppressing the particulate matters, it is effective to split spraying in one combustion stroke into a plurality of times for injection (hereinafter, referred to as a split injection). With the split injection, adhesion of fuel to a piston and a cylinder wall surface can be suppressed. Therefore, the injected fuel can be easily vaporized, and the total amount of the particulate matters and the particulate number (the number of particulate matters) can be suppressed. The engine performing the split injection needs to split one fuel injection so far into a plurality of times for the injection. Therefore, in the fuel injection device, there is a need to control a fine injection amount compared to the related art. In addition, in a multi-stage injection, the particulate number can be easily suppressed by increasing the number of times of injection. Therefore, the fuel injection device is required to be improved in responsiveness and to reduce an interval of fuel injections.

In general, the injection amount of the fuel injection device is controlled by a pulse width of an injection pulse which is output by an engine control unit (ECU). In a normally-closed magnetic fuel injection device, there is a bias member which generates a force in a closing direction. A drive unit is configured by a coil, a fixed core, and a movable element. A magnetic attraction force is generated between the fixed core and the movable element by supplying a current to the coil. The movable element moves in the opening direction at the time when the magnetic attraction force exceeds the force in the closing direction. The valve is separated from a valve seat and starts to open at timing when the movable element comes into conflict with a valve. When the current supplying to the coil is stopped after the valve is opened, the attraction force generated between the fixed core and the movable element is lowered, and the valve starts to be closed at a time point when the force becomes smaller than a force in the closing direction.

In general, a drive circuit of the magnetic fuel injection device applies a high voltage from a high-voltage source to the coil at the beginning when the injection pulse is output in order to make the valve to move quickly from a closed state to an open state, and controls the current of the coil to steeply rise up. Thereafter, the movable element is separated from the valve seat, and moves in the direction of the fixed core. Then, the voltage is switched to a low voltage to control a switch to supply a constant current to the coil. In a case where the current supplying to the coil is stopped after the movable element comes into conflict with the core, the movable element is delayed in opening. Thus, a controllable injection amount is restricted. Therefore, the current supplying to the coil is stopped before the movable element comes into conflict with the fixed core. The valve is required to be controlled on a condition that the movable element and the valve move parabolically (that is, a half lift).

In addition, on the condition of the half lift, the displacement of the movable element is not restricted to the fixed core, and thus the operation becomes unstable. The operation is easily influenced by a change in environmental condition such as an applying voltage of the coil.

For example, PTL 1 discloses a method of controlling the change of the environmental condition. In PTL 1, a maximum current of a drive current flowing to a drive coil of the fuel injection device is changed according to a driving condition to secure the stability of the movable element and to reduce a deviation of the injection amount.

CITATION LIST

Patent Literature

PTL 1: JP 2014-092080 A

SUMMARY OF INVENTION

Technical Problem

However, the voltage source which applies a voltage to the coil of the fuel injection device varies in its voltage due to energizing and de-energizing of the device connected to the voltage source. Therefore, the current supplied to the coil may be deviated.

An object of the invention is to provide a control device of a fuel injection device which can stabilize a behavior of the valve even when the voltage of the voltage source varies, and reduce the deviation of an injection amount.

Solution to Problem

A control device of a fuel injection device of the invention to solve the above problem includes a valve and a coil to generate a magnetic attraction force attracting a movable portion to drive the valve. A predetermined voltage is applied to the coil on the basis of an injection pulse, a drive current flows to the coil until the drive current reaches a maximum current, and the movable portion is attracted to drive the valve to inject fuel. The drive current flowing to the coil is lowered from the maximum current before the valve reaches a desired maximum lift position. A constant voltage lower than the predetermined voltage or 0 V is continuously applied to the coil until the valve reaches the desired maximum lift position.

Advantageous Effects of Invention

According to the invention, it is possible to provide a control device of a fuel injection device which can stabilize a behavior of a valve even when a voltage of a voltage source varies, and can reduce a deviation of an injection amount.

DESCRIPTION OF EMBODIMENTS

Figure 1:
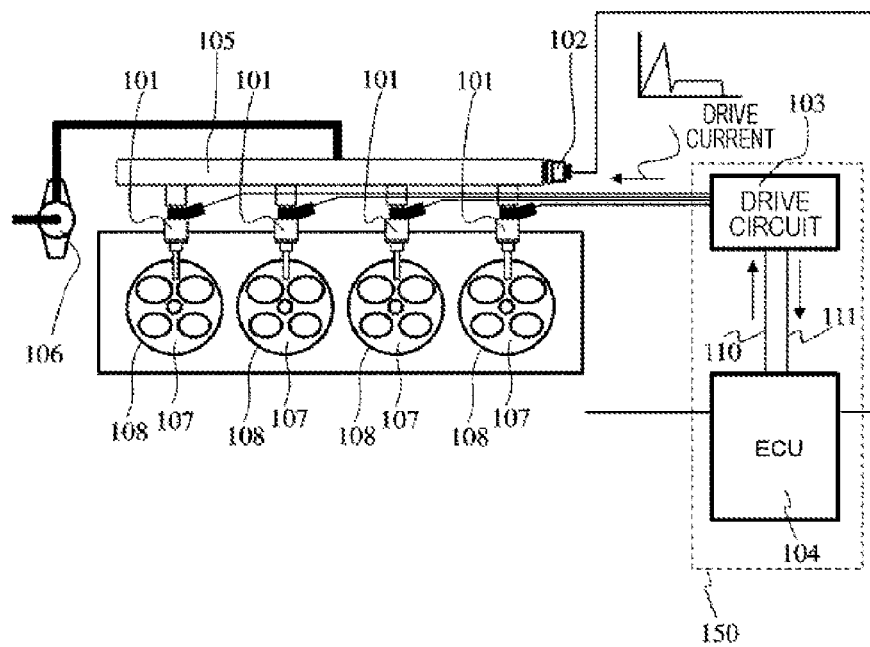
FIG. 1 is a schematic diagram of a fuel injection system which is configured by a fuel injection device, a pressure sensor, and a control device.

Hereinafter, a control device 150 of a fuel injection device 101 according to a first embodiment of the invention will be described with reference to the drawings.

First, a fuel injection system configured by the fuel injection device 101, a pressure sensor 102, and the control device 150 according to this embodiment will be described with reference to FIG. 1.

The fuel injection device 101 is installed in each cylinder 108 to directly spray fuel from the injection hole to a fuel chamber 107. The fuel is increased in pressure by a fuel pump 106 and sent to a fuel pipe 105, and delivered to the fuel injection device 101. The fuel pressure varies according to a balance between a flow amount of the fuel discharged by the fuel pump 106 and an injection amount of the fuel injected into the fuel chamber 107 by the fuel injection device installed in each cylinder 108 of the engine. However, the discharge amount of the fuel from the fuel pump 106 is controlled such that the pressure in the fuel pipe 105 becomes a predetermined pressure on the basis of the information of the pressure sensor 102.

The fuel injection of the fuel injection device 101 is controlled by an injection pulse width sent from an engine control unit (ECU) 104. The injection pulse is input to a drive circuit 103 from the ECU 104. A drive current waveform is determined by the drive circuit 103 on the basis of the injection pulse from the ECU 104. The drive current waveform is supplied to each fuel injection device 101 only by time based on the input injection pulse. Further, the drive circuit 103 may be mounted as an integral part with the ECU 104 or a substrate. The integral device of the drive circuit 103 and the ECU 104 is called the control device 150.

Next, the configurations and basic operations of the fuel injection device 101 and the control device 150 will be described.

Figure 2:
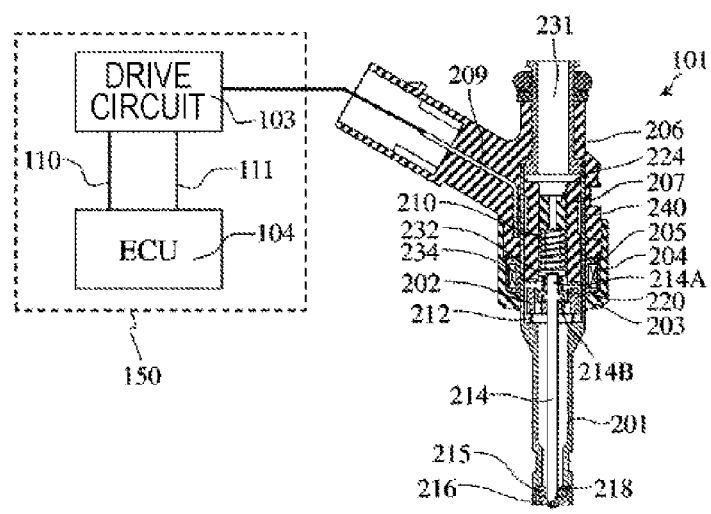
FIG. 2 is a vertical cross-sectional view of the fuel injection device and a diagram illustrating exemplary configurations of a drive circuit for driving the fuel injection device and an engine control unit (ECU).

FIG. 2 is a vertical cross-sectional view of the fuel injection device 101 and a diagram illustrating an exemplary configuration of the drive circuit 103 and the ECU 104 for driving the fuel injection device 101. In FIG. 2, the same components as those of FIG. 1 will be attached with the same symbol.

Figure 3:
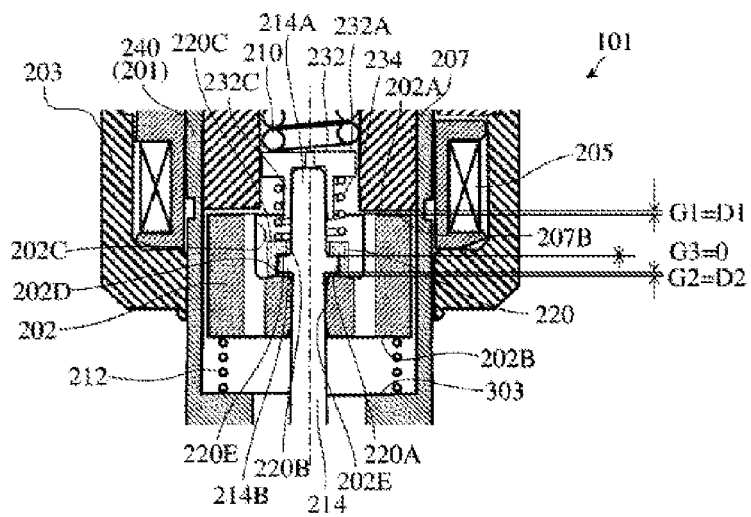
FIG. 3 is a partially enlarged cross-sectional view of the fuel injection device.

FIG. 3 illustrates a partially enlarged cross-sectional view of the fuel injection device 101.

In the ECU 104, signals indicating the states of the engine are input from various types of sensors, and the widths and the injection timings of the injection pulse are calculated to control the injection amount of the fuel to be injected from the fuel injection device 101 according to a driving condition of an internal combustion engine. In addition, the ECU 104 is provided with an A/D converter and I/O ports to receive the signals from various types of sensors. The injection pulse output by the ECU 104 is input to the drive circuit 103 through a signal line 110. The drive circuit 103 controls a voltage to be applied to a solenoid (coil) 205, and supplies the current. The ECU 104 communicates with the drive circuit 103 through a communication line 111, and can switch the drive current generated by the drive circuit 103 according to the pressure of the fuel to be supplied to the fuel injection device 101 and the driving condition, and can change settings of the current and time.

The fuel injection device 101 illustrated in FIGS. 2 and 3 is a normally-closed electromagnetic valve (electromagnetic fuel injection device). In a state where the coil 205 is not energized, a valve 214 is biased in a closing direction by a first spring 210. The valve 214 contacts a valve seat 218 and closed.

The fuel injection device 101 includes a nozzle 101A and an electromagnetic drive unit 101B.

The nozzle 101A includes a nozzle holder 201, a valve 214, a guide member 215, and an orifice cup 216.

The nozzle holder 201 is formed in a cylindrical shape, and is provided with the guide member 215 of an annular shape, and the orifice cup 216 so as to close the lower end thereof. The valve 214 is formed in a rod shape, and the lower end thereof abuts on or is separated from the valve seat 218 of the orifice cup 216 to open or close the fuel injection device 101. In an upper end 214A of the valve 214, there is provided a stepped portion 214B in a flange shape to protrude to the outer side in the radial direction.

The electromagnetic drive unit 101B includes a housing 203, a connector 206, a fixed core 207, the coil (solenoid) 205, a movable element 202, an intermediate member 220, a cap 232, the first spring 210, a second spring 212, and a third spring 234.

The housing 203 is formed in a cylindrical shape, and is fixed to the outer periphery of a large-diameter cylindrical portion 240 of the nozzle holder 201. The housing 203 forms the outer peripheral yoke of the electromagnetic drive unit 101B.

The connector 206 is fixed to the inner periphery of the housing 203, and covers the outer periphery of the large-diameter cylindrical portion 240 of the nozzle holder 201. In the connector 206, a rigid conductor 209 is provided.

The coil 205 is formed in an annular shape or a cylindrical shape, and is disposed in a cylindrical space formed by the inner periphery of the housing 203 and the outer periphery of the large-diameter cylindrical portion 240. The coil 205 is configured by a cylindrical bobbin having an annular groove and a copper wire wound around the groove. The conductor 209 is fixed to the ends of a winding start and a winding end of the coil 205. The conductor 209, the fixed core 207, and the outer periphery of the large-diameter cylindrical portion 240 of the nozzle holder 201 are molded by injecting an insulating resin from the upper end of the housing 203, and covered with the resin molded body. An annular magnetic passage is formed in the fixed core 207, the movable element 202, the large-diameter cylindrical portion 240 of the nozzle holder 201, and the housing 203 to surround the coil 205.

The fixed core 207 is formed in a cylindrical shape, is pressed fit into the large-diameter cylindrical portion 240 of the nozzle holder 201, and bonded by welding at a press fit contact position. The gap formed between the inner portion of the large-diameter cylindrical portion 240 of the nozzle holder 201 and the ambient air is sealed by the welding of the fixed core 207. The fixed core 207 is provided with a through hole having a diameter slightly larger than the diameter of the intermediate member 220 as a fuel passage in its center. The through hole of the fixed core 207 communicates with a fuel passage hole 231. Further, the fixed core 207 is a component which applies a magnetic attraction force to the movable element 202 to attract the movable element 202 in the opening direction.

The movable element 202 is disposed on the lower side of the fixed core 207, and includes an upper end surface 202A and a lower end surface 202B. In the upper end surface 202A, a concave portion 202C is dented toward the lower end surface 202B. In addition, the movable element 202 includes a bottom surface 202D of the concave portion 202C. A through hole 202E is formed in the movable element 202.

The intermediate member 220 is disposed in the concave portion 202C of the movable element 202. On the lower surface side of the intermediate member 220, a concave portion 220A is dented toward the upper side. The concave portion 220A is formed to have a diameter (inner diameter) and a depth capable of storing the stepped portion 214B of the upper end 214A. In other words, the diameter (inner diameter) of the concave portion 220A is larger than the diameter (outer diameter) of the stepped portion 214B. A depth dimension of the concave portion 220A is larger than a dimension between an upper end surface and a lower end surface of the stepped portion 214B. The through hole 220B is formed in the bottom of the concave portion 220A where the upper end 214A passes therethrough. An upper end surface 220C of the intermediate member 220 forms a spring seat on which one end of the third spring 234 abuts.

The cap 232 is located on the upper side of the intermediate member 220 in the fixed core 207, and includes a flange portion 232A and a cylindrical portion 232C. The upper end 214A of the valve 214 is pressed fit into the cylindrical portion 232C. The flange portion 232A is formed to protrude from the upper end of the cylindrical portion 232C to the outer side in the radial direction. The lower surface of the flange portion 232A forms a spring seat on which the other end of the third spring 234 abuts. The cap 232 is inserted to the through hole of the fixed core 207 in a state where the flange portion 232A of the cap 232 is gaped in the inner periphery of the through hole of the fixed core 207.

Since the cap 232 and the intermediate member 220 form the spring seat of the third spring 234, the diameter (inner diameter) of the through hole 220B of the intermediate member 220 is configured to be smaller than the diameter (outer diameter) of the flange portion 232A of the cap 232.

The first spring 210 is a spring for setting an initial load, and is disposed on the upper side of the cap 232 in the fixed core 207. The lower end of the first spring 210 abuts on the cap 232, and biases the cap 232 toward the lower side. An adjusting pin 224 is provided on the upper side of the first spring 210 to press the fixed core 207 to be fitted into the through hole. Therefore, the first spring 210 is disposed between the cap 232 and the adjusting pin 224. The upper end of the first spring 210 abuts on the adjusting pin 224. The initial load of pressing the valve 214 to the valve seat 218 by the first spring 210 can be adjusted by adjusting the fixed position of the adjusting pin 224.

The second spring 212 is provided on the lower side of the movable element 202, and biases the movable element 202 toward the fixed core 207.

The third spring 234 is disposed between the intermediate member 220 and the cap 232. The third spring 234 biases the movable element 202 from the fixed core 207 to the closing direction (lower side).

In addition, in the first spring 210, the second spring 212, and the third spring 234, the spring force (biasing force) of the first spring 210 is largest, the spring force (biasing force) of the third spring 234 is next, and the spring force (biasing force) of the second spring 212 is smallest.

The cap 232 receives the biasing force of the first spring 210 from the upper side, and receives the biasing force (set load) of the third spring 234 from the lower side. The biasing force of the first spring 210 is larger than the biasing force of the third spring 234. Therefore, the cap 232 is pressed to the upper end 214A of the valve 214 by the biasing force, which is a difference between the biasing force of the first spring 210 and the biasing force of the third spring 234. Since the cap 232 is not applied with a force in a direction loosing from the upper end 214A, the cap 232 may be only pressed and fixed to the upper end 214A without being welded.

In addition, there is a need to provide a gap to some degree between the lower end surface of the cap 232 and an upper end surface 320C of the intermediate member 220 to dispose the third spring 234. Therefore, the length of the cylindrical portion 232C of the cap 232 is easily secured.

The fuel injection device 101 illustrated in FIGS. 2 and 3 is in a state where the valve 214 receives the biasing force of the first spring 210, the magnetic attraction force is not applied to the movable element 202, and the valve 214 abuts on the valve seat 218 to stably close the fuel injection device 101.

In this state, the intermediate member 220 receives the biasing force of the third spring 234, and a bottom surface 220E of the concave portion 220A abuts on an upper end surface of the stepped portion 214B of the valve 214. In other words, the size (dimension) of a gap G3 between the bottom surface 220E of the concave portion 220A and the upper end surface of the stepped portion 214B is zero. The bottom surface 220E of the intermediate member 220 and the upper end surface of the stepped portion 214B form a contact surface where the intermediate member 220 and the stepped portion 214B of the valve 214 abut on each other.

In addition, the movable element 202 is biased toward the fixed core 207 by the second spring 212. Therefore, the bottom surface 202D abuts on the lower end surface of the intermediate member 220. Since the biasing force of the second spring 212 is smaller than the biasing force of the third spring 234, the movable element 202 is not possible to press back the intermediate member 220 biased by the third spring 234, but is stopped its movement to the upper side (the opening direction) by the intermediate member 220 and the third spring 234.

The depth dimension of the concave portion 220A of the intermediate member 220 is larger than the dimension between the upper end surface and the lower end surface of the stepped portion 214B. Therefore, in the state illustrated in FIG. 3, the bottom surface 202D of the movable element 202 does not abut on the lower end surface of the stepped portion 214B of the valve 214. A gap G2 between the bottom surface 202D of the movable element 202 and the lower end surface of the stepped portion of the valve 214 has a size (dimension) of D2. The gap G2 is smaller than the size (dimension) D1 of a gap G1 between the upper end surface (a facing surface to a fixed core 207) 202A of the movable element 202 and the lower end surface (a facing surface to the movable element 202) 207B of the fixed core 107 (D2<D1). As described herein, the intermediate member 220 is a member to form the gap G2 having a size of D2 between the movable element 202 and the lower end surface of the stepped portion 214B, and may be called a gap forming member.

In a state where the intermediate member 220 is positioned at the upper end surface of the stepped portion 214B of the valve 214 (reference position), the lower end surface of the intermediate member 220 abuts on the bottom surface 202D of the movable element 202, so that the intermediate member 220 forms the gap D2 between the lower end surface of the stepped portion 214B of the valve 214 and the bottom surface 202D of the movable element 202. The third spring 234 biases the intermediate member 220 in the closing direction such that the intermediate member 220 is located at the upper end surface of the stepped portion 214B (reference position). The bottom surface 220E of the concave portion 220A abuts on the upper end surface of the stepped portion 214B (reference position), so that the intermediate member 220 is positioned at the upper end surface of the stepped portion 214B (reference position).

In addition, in the valve 214, a diameter of the through hole 202E formed in the movable element 202 is smaller than that of the stepped portion 214B. Therefore, at the time of an opening operation of shifting from a closed state to an open state or at the time of a closing operation of shifting from the open state to the closed state, the lower end surface of the stepped portion 214B of the valve 214 engages with the movable element 202, and the movable element 202 and a valve 114 move in cooperation with each other. However, in a case where a force moving the valve 114 to the upper side or a force moving the movable element 202 to the lower side is independently applied, the valve 114 and the movable element 202 can move separate directions. The operations of the movable element 202 and the valve 214 will be described in detail below.

In addition, the movable element 202 is guided in its movements upward/downward (in the opening/closing direction) when the outer peripheral surface thereof abuts on an inner peripheral surface of the nozzle holder 201. Further, the valve 214 is guided in its movements upward/downward (in the opening/closing direction) when the outer peripheral surface thereof abuts on an inner peripheral surface of the through hole 202E of the movable element 202. In other words, the inner peripheral surface of the nozzle holder 201 serves as a guide when the movable element 202 moves in the axial direction. The inner peripheral surface of the through hole of the movable element 202 serves as a guide when the valve 214 moves in the axial direction. The tip portion of the valve 214 is guided by a guide hole of the guide member 215, and guided to reciprocate straightly by the guide member 215 and the nozzle holder 201 and the through hole of the movable element 202.

In addition, the description has been made about that the upper end surface 202A of the movable element 202 and a lower end surface 207B of the fixed core 207 abut on each other. However, a protrusion may be provided in any one of the upper end surface 202A of the movable element 202 and the lower end surface 207B of the fixed core 207, or in both of the upper end surface 202A of the movable element 202 and the lower end surface 207B of the fixed core 207, so that the protrusion and the end surface, or the protrusions may be configured to abut each other. In this case, the gap G1 becomes a gap between the abutting portion on a side near the movable element 202 and the abutting portion on a side near the fixed core 207.

In addition, a stroke of the movable element 202 is adjusted such that the movable element 202 is set in the large-diameter cylindrical portion 240 of the nozzle holder 201, the solenoid 205 (coil) wound around a bobbin 204 and the housing 203 are mounted in the outer periphery of the large-diameter cylindrical portion 240 of the nozzle holder 201, and then the valve 214 assembled with the cap 232, the intermediate member 220, and the third spring 234 moves to pass the through hole of the fixed core 207 to be inserted in the movable element 202. In this state, the valve 214 is pressed to a close position by a tool, a fit position of the orifice cup 216 is determined while a stroke of the valve 214 when the coil 205 is energized is detected, so that the stroke of the valve 214 is adjusted to an arbitrary position.

In a state where an initial load of the spring 210 is adjusted, the lower end surface 207B of the fixed core 207 is magnetically attracted by about 40 to 100 micron to face the upper end surface 202A of the movable element 202 with the gap G1 therebetween. Further, the drawings are illustrated on an enlarged scale while ratios of dimensions are ignored.

In addition, the fuel supplied to the fuel injection device 101 is supplied from the fuel pipe 105 which is provided on the upstream side of the fuel injection device 101, flows through the fuel passage hole 231 up to the tip of the valve 214, and sealed by a seat portion formed in the end on a side near the valve seat 218 of the valve 214 and the valve seat 218. At the time of closing, a differential pressure between the upper portion and the lower portion of the valve 214 is generated by the fuel pressure. The valve 214 is pressed in the closing direction by the fuel pressure and a force on a pressed area of the seat inner diameter at the valve seat. In the closed state, the gap G2 is provided through the intermediate member 220 between the contact surface to the movable element 202 of the valve 214 and the movable element 202. With the gap G2, the movable element 202 and the valve 214 are disposed through a gap therebetween in the axial direction in a state where the valve 214 is seated in the valve seat 218.

When the current is supplied to the solenoid 205, a magnetic flux passes between the fixed core 207 and the movable element 202 by a magnetic field generated by a magnetic circuit, and the magnetic attraction force is applied to the movable element 202. The movable element 202 starts to be displaced in the direction of the fixed core 207 at timing when the magnetic attraction force applying to the movable element 202 exceeds the load of the third spring 234. At this time, since the valve 214 contacts the valve seat 218, the movement of the movable element 202 is an idle running which is performed in a state of no fuel flow, and performed separately from the valve 214 receiving the difference pressure by the fuel pressure. Therefore, the valve 214 is not affected by the fuel pressure and the like and can move at a high speed.

In addition, the load of the first spring 210 suppresses the fuel injection even in a case where the fuel pressure in the engine is increased, so that there is a need to provide a strong spring load. In other words, the load of the first spring 210 is not applied to the valve 214 in the closed state, so that the valve 214 can move at a high speed.

When a displacement amount of the movable element 202 reaches the size of the gap G2, the movable element 202 transfers a force to the valve 214 through the bottom surface 202D, and pulls up the valve 214 in the opening direction. At this time, the movable element 202 performs the idle running to come into conflict with the valve 214 in the state of having kinetic energy. Therefore, the valve 214 receives the kinetic energy of the movable element 202, and starts to be displaced in the opening direction at a high speed. The differential pressure generated along with the pressure of the fuel is applied to the valve 214. The differential pressure applying to the valve 214 is generated when the flow rate of the fuel of the seat portion is increased in a small cross section range of the flow passage near the seat portion of the valve 214, and the pressure of the tip portion of the valve 214 is reduced by a pressure drop generated along with the static pressure drop caused by the Bernoulli effect. The differential pressure is significantly affected by the cross section of the flow passage of the seat portion. Therefore, the differential pressure becomes large on a condition that a displacement amount of the valve 214 is small, and the differential pressure becomes small on a condition that the displacement amount is large. Therefore, the valve 214 is opened with conflict due to the idle running of the movable element 202 at timing when the valve 214 starts to be opened from the closed state, displacement is small, and the opening operation is hardly performed due to the differential pressure becomes increased. Therefore, the opening operation can be performed even in a state where the higher fuel pressure is applied. Alternatively, the first spring 210 may be set with a stronger force with respect to the fuel pressure range required for the operation. When the first spring 210 is set with a stronger force, the time required for the closing operation described below can be shortened, which is effective to the control of a minute injection amount.

After the valve 214 starts the opening operation, the movable element 202 comes into conflict with the fixed core 207. When the movable element 202 comes into conflict with the fixed core 207, the movable element 202 is rebounded. However, the movable element 202 is attracted to the fixed core 207 by the magnetic attraction force applying to the movable element 202, and finally stopped. At this time, a force is applied to the movable element 202 in the direction of the fixed core 207 by the second spring 212. Therefore, the rebounding displacement amount becomes small, and the time taken for converging the rebounding can be shortened. By making the rebounding reduced, the time taken for the gap between the movable element 202 and the fixed core 207 becomes large is shortened, and a stable operation is achieved even in the case of a smaller injection pulse width.

In this way, the movable element 202 and the valve 214 finished the opening operation stand still in the open state. In the open state, a gap is generated between the valve 214 and the valve seat 218, and the fuel is injected. The fuel passes through a center hole provided in the fixed core 207, the fuel passage hole provided in the movable element 202, and the fuel passage hole provided in the guide 215, and flows to the downstream direction. If the energizing to the solenoid 205 is blocked, the magnetic flux generated in the magnetic circuit is disappeared, and the magnetic attraction force is also disappeared. As the magnetic attraction force applying to the movable element 202 is disappeared, the valve 214 is pressed back to the close position to contact the valve seat 218 by the biasing force of the first spring 210 and the force of the fuel pressure.

Next, the configuration of the control device 150 of the fuel injection device 101 according to this embodiment will be described using FIG. 5.

Figure 5:
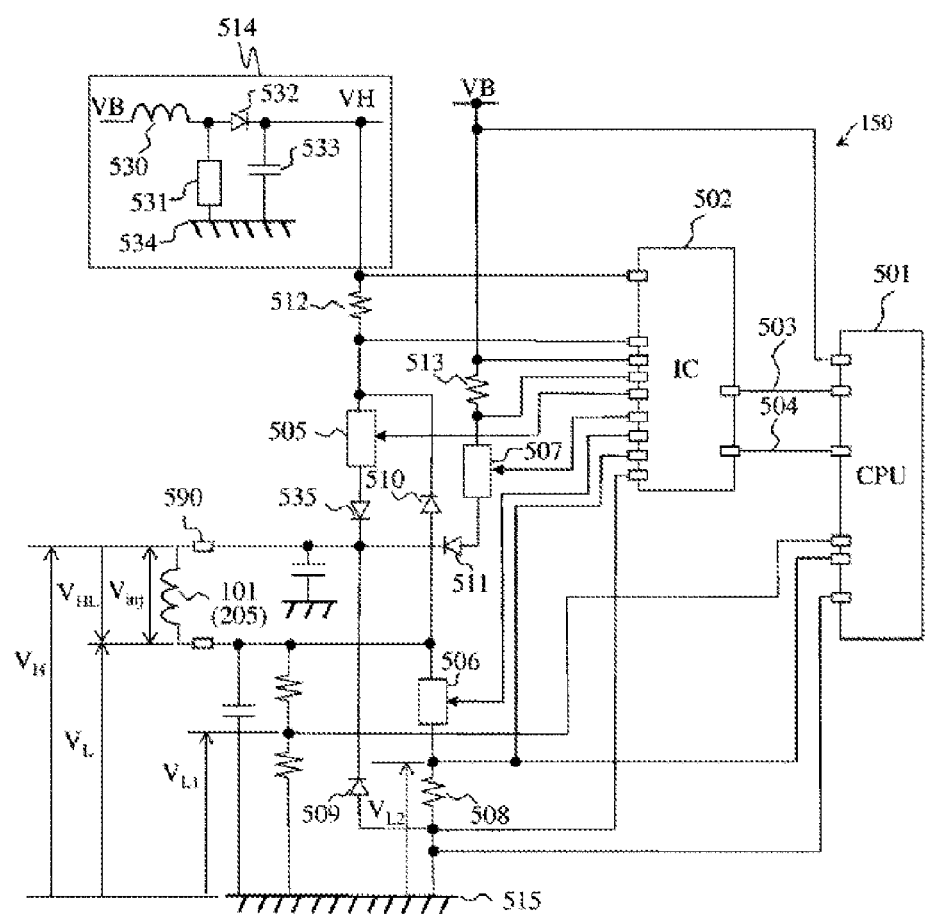
FIG. 5 is a diagram illustrating configurations of the drive circuit and an ECU of the fuel injection device.

FIG. 5 is a diagram illustrating configurations of the drive circuit 103 and the ECU 104 of the fuel injection device 101.

For example, a CPU 501 is built in the ECU 104, and receives signals indicating the states of the engine from various types of sensors such as the pressure sensor 102 attached to the fuel pipe on the upstream side of the fuel injection device 101, an A/F sensor to measure an air amount flowing into the engine cylinder, an oxygen sensor to detect an oxygen concentration in the exhaust gas discharged from the engine cylinder, and a crank angle sensor. The CPU calculates the width of the injection pulse to control the injection amount injected from the fuel injection device and the injection timing according to the driving condition of the internal combustion engine. In addition, the CPU 501 calculates a pulse width (that is, the injection amount) of an appropriate injection pulse width Ti and the injection timing according to the driving condition of the internal combustion engine, and outputs the injection pulse width to a drive IC 502 of the fuel injection device through a communication line 504. Thereafter, switching elements 505, 506, and 507 are switched between energizing and de-energizing by the drive IC 502 to supply the drive current to the fuel injection device 101.

In addition, the ECU 104 is mounted with a register and a memory to store numerical data which is necessary for the control of the engine such as the calculation of the injection pulse width. The register and the memory are included in the CPU 501 in the control device 150 or the control device 150.

The switching elements 505, 506, and 507 are configured by FETs and transistors for example, and can switch the energizing and the de-energizing to the fuel injection device 101.

The switching element 505 is connected between a high-voltage source higher than a voltage source VB (also referred to as low-voltage source) input to the drive circuit and the terminal on a side near the high voltage of the fuel injection device 101. A boosting voltage VH (an initial voltage) of the high-voltage source is, for example, 60 V, and is generated by boosting the battery voltage by a boosting circuit 514. The boosting circuit 514 is configured by a DC/DC converter, for example, and may be configured by a coil 530, a transistor 531, a diode 532, and a capacitor 533. In the case of the latter boosting circuit 514, if the transistor 531 is turned ON, the battery voltage VB flows toward a ground potential 534. If the transistor 531 is turned OFF, the high voltage generated in the coil 530 is rectified by the diode 532 and electric charges are accumulated in the capacitor 533. Until becoming the boosting voltage VH, the transistor is repeatedly turned ON and OFF, and the voltage of the capacitor 533 is increased. The transistor 531 is connected to the IC 502 to the CPU 501, and the boosting voltage VH output from the boosting circuit 514 is detected by the IC 502 or the CPU 501.

A diode 535 is provided between a terminal 590 on the power source side of the solenoid 205 and the switching element 505 to cause the current flow from a second voltage source (the high-voltage source) toward the solenoid 205 and a ground potential 515. Further, a diode 511 is provided also between the terminal 590 on the power source side of the solenoid 205 and the switching element 507 to cause the current flow from the battery voltage source toward the solenoid 205 and the ground potential 515. The current does not flow from the ground potential 515 toward the solenoid 205, the battery voltage source, and the second voltage source (the high-voltage source) during a period when the switching elements 505 and 507 are energized.

In addition, the switching element 507 is connected between the low-voltage source (the voltage source VB) and the terminal 590 on the power source side of the fuel injection device 101. The low-voltage source is, for example, a battery voltage, and the voltage thereof is about 12 to 14 V. The switching element 506 is connected between the terminal on the lower voltage side of the fuel injection device 101 and the ground potential 515. The drive IC 502 detects a current value flowing to the fuel injection device 101 using current-detection resistors 508, 512, and 513, switches the energizing and the de-energizing of the switching elements 505, 506, and 507 according to the detected current value, and generates a desired drive current. Diodes 509 and 510 are provided to apply a reverse voltage to the solenoid 205 of the fuel injection device 101, and to steeply reduce the current supplied to the solenoid 205. The CPU 501 communicates with the drive IC 502 through a communication line 503, and can switch the drive current generated by the drive IC 502 according to the pressure of the fuel to be supplied to the fuel injection device 101 and the driving condition. In addition, both ends of the resistors 508, 512, and 513 are connected to an A/D conversion port of the IC 502, and configured to detect the voltage applied on both ends of the resistors 508, 512, and 513 by the IC 502.

Next, the description will be given about a relation between the injection pulse output from the ECU 104 in this embodiment, a drive voltage of the both ends of the terminals of the solenoid 205 of the fuel injection device 101, the drive current (excitation current), and the displacement amount (valve behavior) of the valve 214 of the fuel injection device 101, and a relation between the injection pulse and the fuel injection amount with reference to FIGS. 4 and 7.

Figure 4:
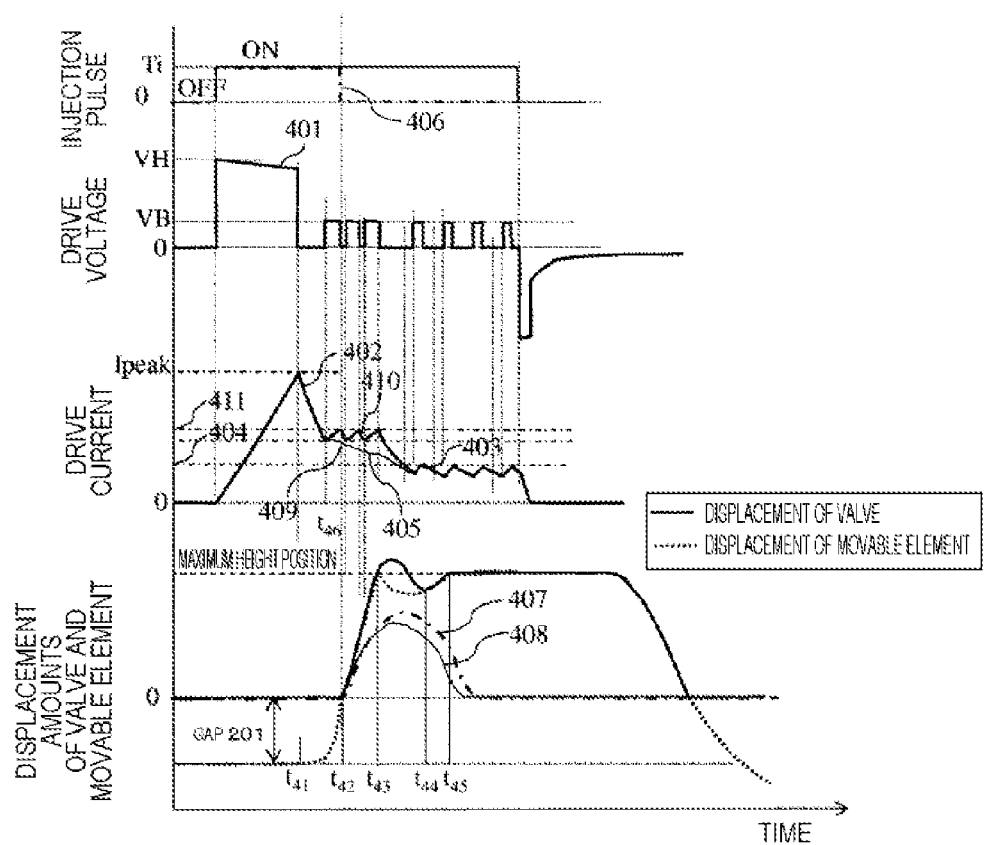
FIG. 4 is a diagram illustrating a relation between a typical injection pulse to drive the fuel injection device, a drive voltage and a drive current to be supplied to the fuel injection device, a valve displacement amount, and time.

FIG. 4 is a diagram illustrating a relation between a typical injection pulse to drive the fuel injection device 101, a drive voltage and a drive current to be supplied to the fuel injection device 101, a valve displacement amount, and time.

Figure 7:
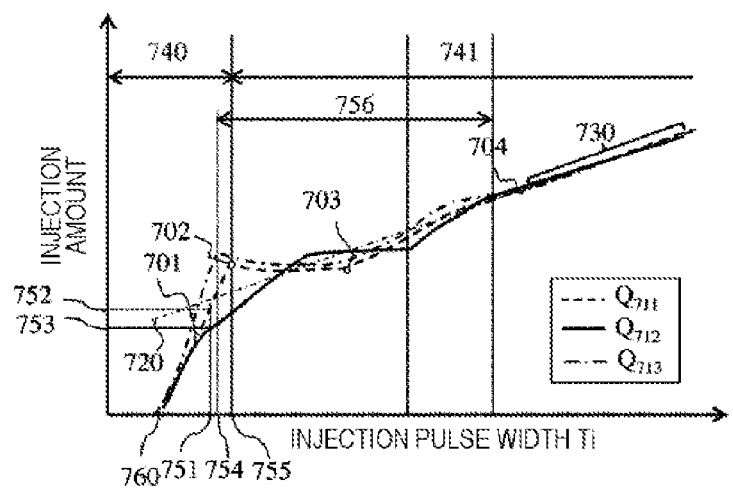
FIG. 7 is a diagram illustrating a relation between the injection pulse and an injection amount.

FIG. 7 is a diagram illustrating a relation between the injection pulse and the injection amount.

If the injection pulse is input to the drive circuit 103, the drive circuit 103 energizes the switching elements 505 and 506 to apply a high voltage 401 from the high-voltage source (the boosting circuit 514) boosted to a voltage higher than the battery voltage to the solenoid 205, and starts to supply the current to the solenoid 205. If the current reaches a maximum drive current $I_{peak}$ (hereinafter, referred to as maximum current) which is predetermined in the ECU 104, the application of the high voltage 401 is stopped.

If the switching element 506 is turned ON in a period of shifting from the maximum current $I_{peak}$ to a current 403, and de-energizes the switching elements 505 and 507, the solenoid 205 is applied with 0 V, the current flows in the paths of the fuel injection device 101, the switching element 506, the resistor 508, the ground potential 515, and the fuel injection device 101, and the current is smoothly reduced. Since the current is smoothly reduced, the current supplied to the solenoid 205 is secured. Even in a case where the fuel pressure to be supplied to the fuel injection device 101 is increased, the movable element 202 and the valve 214 can be stably opened.

In addition, if the switching elements 505, 506, and 507 are turned OFF during a period of shifting from the maximum current $I_{peak}$ to the current 403, the diode 509 and the diode 510 are energized by a counter electromotive force caused by the inductance of the fuel injection device 101, the current is fed back toward the voltage source VH, and the current supplied to the fuel injection device 101 is steeply reduced from the maximum current $I_{peak}$ as the current 402. As a result, the time required for reaching the current 403 is shortened. The time taken for the magnetic attraction force to be constant after reaching the current 403 and a constant delay time is shortened. FIG. 4 illustrates a profile in a case where the drive current is smoothly reduced after reaching the maximum current Ipeak.

If the current becomes smaller than a predetermined current 404, the drive circuit 103 energizes the switching element 506, applies the battery voltage VB by energizing/de-energizing the switching element 507, and a switching period such that the current 403 is secured within a predetermined range where the drive current falls within a predetermined range is provided. With this configuration, the valve 214 is held at a maximum height position. In addition, a gap (air layer) between the movable element 202 and the fixed core 207 is large at a time point (immediately after timing $t_{41}$) when the movable element 202 starts to move, and the magnetic flux is hardly generated. Then, as illustrated with a current 410, the drive current is set to be held within a predetermined range of which the maximum is a current 411, and a current larger than the current 403 flows to apply a large magnetic attraction force to the movable element 202.

In addition, if the fuel pressure supplied to the fuel injection device 101 becomes large, a fluid force applying to the valve 214 is increased, and the time for the valve 214 to reach a target opening becomes long. As a result, a timing of reaching the target opening may be delayed with respect to the reaching time of the maximum current $I_{peak}$. However, if the current is steeply lowered, the magnetic attraction force applying to the movable element 202 is also steeply reduced. Therefore, the behavior of the valve 214 becomes unstable and the valve may be closed regardless of the energizing depending on cases. In a case where the current is smoothly reduced by energizing the switching element 506 during a period of shifting from the maximum current $I_{peak}$ to the current 403, the reduction of the magnetic attraction force can be suppressed, the stability of the valve 214 in a high fuel pressure can be secured, and the deviation in the injection amount can be suppressed.

With such a profile of the drive current, the fuel injection device 101 is driven. During a period from the application of the high voltage 401 to the maximum current $I_{peak}$ the movable element 202 starts to be displaced at timing $t_{41}$, and the valve 214 starts to be displaced at $t_{42}$. Thereafter, the movable element 202 and the valve 214 reach a maximum height position (maximum lift position). Further, a displacement amount when the movable element 202 contacts the fixed core 207 is set to a maximum height position.

At timing $t_{43}$ when the movable element 202 reaches the maximum height position, the movable element 202 comes into conflict with the fixed core 207, and the movable element 202 bounds in a gap with respect to the fixed core 207. Since the valve 214 is configured to be relatively displaced with respect to the movable element 202, the valve 214 is separated from the movable element 202, and the displacement of the valve 214 exceeds and overshoots the maximum height position. Thereafter, the movable element 202 stops at the maximum height position by the magnetic attraction force generated by the holding current 403 and the force in the opening direction of the second spring 212. The valve 214 seats on the movable element 202 to stop at the maximum height position and enters the open state.

In the case of a fuel injection device including the movable valve in which the valve 214 and the movable element 202 are integrally formed, the displacement amount of the valve 214 does not become larger than the maximum height position. The displacement amounts of the movable element 202 and the valve 214 after reaching the maximum height position become equal.

Next, the description will be given using FIG. 7 about a relation between the injection pulse width and the injection amount in a case where the conventional current waveform illustrated in FIG. 4 is used. FIG. 7 illustrates a relation (the injection amount characteristics Q711 and Q712) between the injection pulse width and the injection amount in a case where the fuel injection device 101 is controlled by the drive current waveform of FIG. 4. In FIG. 7, the injection pulse width on the condition of 406 in which the injection pulse of FIG. 4 is short is set to an injection pulse width 751. In addition, the injection amount characteristic in a case where the voltage of the low-voltage source applying to the coil 205 is high is set to Q711, and the injection amount characteristic in a case where the voltage of the low-voltage source is low is set to Q712.

First, the relation between the injection pulse and the injection amount will be described using the injection amount characteristic Q711. When the injection pulse width Ti does not reach a certain time, that is, on a condition that the injection pulse width is smaller than an injection pulse width 760, a force in the opening direction of the resultant force of the magnetic attraction force applying to the movable element 202 and the second spring 212 is not greater than the force in the closing direction which is a load of the third spring 234. Alternatively, on a condition that a magnetic attraction force necessary for running in the gap G2 cannot be secured and the movable element 202 does not contact the valve 214 even if the movable element 202 starts to be displaced, the valve 214 is not opened, and the fuel is not injected.

In addition, on a condition that the injection pulse width Ti is short (for example, point 701), the movable element 202 comes into conflict with the valve 214, and the valve 214 is separated from the valve seat 218, and starts to be lifted. However, the valve 214 starts to be closed before reaching the target lift position. Therefore, the injection amount is reduced from a straight region 730 where the relation between the injection pulse width and the injection amount becomes a straight line to an inserted dashed line 720.

In addition, in the pulse width of point 702, the valve 214 starts to be closed immediately after reaching the maximum height position, and the locus of the valve 214 moves parabolically. On this condition, the kinetic energy in the opening direction of the valve 214 is large, and the magnetic attraction force applying to the movable element 202 is large. Therefore, a ratio of time required for closing the valve becomes large, and the injection amount becomes large with respect to the dashed line 720. A region 740 where the movable element 202 does not contact the fixed core 207, and the locus of the valve 214 moves parabolically is called a half-lift region. A region 741 where the movable element 202 contacts the fixed core 207 is called a full-lift region.

In the injection pulse width at point 703, the valve starts to be closed at timing when the bounding amount of the valve 214 caused by the conflict of the movable element 202 with the fixed core 207 is maximized. Therefore, a repulsive force generated when the movable element 202 and the fixed core 207 come into conflict with each other is applied to the movable element 202, and a closing delay time taken for closing the valve 214 after the injection pulse is turned OFF becomes small. As a result, the injection amount becomes small with respect to the dashed line 720.

A point 704 indicates a state where the valve starts to close at timing $t_{45}$ immediately after the bounding of the valve is converged. In the injection pulse width Ti larger than that at the point 704, the injection amount of the fuel is almost linearly increased as the injection pulse width Ti is increased. In a region up to the pulse width Ti indicated by the point 704 after the fuel starts to be injected, the valve 214 does not reach the maximum height position, or the bounding of the valve 214 is not stable even if the valve 214 reaches the maximum height position. Therefore, the injection amount varies. In order to make a controllable minimum injection amount small, there is a need to increase the region where the injection amount of the fuel is linearly increased as the injection pulse width Ti is increased, or to suppress the deviation in the injection amount of the nonlinear region where the relation between the injection pulse width Ti smaller than that at 704 and the injection amount is not linear.

On the other hand, in the half-lift region 740 where the valve 214 is driven to reach a height position lower than the maximum height position, there occurs an unstable behavior that the valve 214 does not contact the fixed core 207 (stopper). Therefore, in order to accurately control the injection amount, there is a need to accurately control the magnetic attraction force applying to the movable element 202 and the magnetic attraction force applying to the movable element 202 after the valve 214 starts to be opened which are used to determine the speed when the movable element 202 comes into conflict with the valve 214.

The magnetic attraction force applying to the movable element 202 is affected by a counter electromotive voltage generated by the movement of the movable element 202 and a voltage to be applied to the coil. The relation between a voltage V applied to the coil 205, a resistance R of the coil 205, a current I flowing to the coil 205, and a counter electromotive voltage L·di/dt is represented in (1). Further, L in the term of the counter electromotive voltage represents an inductance of the fuel injection device, and di/dt represents a time differential value of the current flowing to the coil 205.

$$V = R \cdot I - L * di/dt \quad (1)$$

On a condition that the valve 214 has an intermediate opening smaller than a maximum lift, the inductance L and the temporal change of the current are large along with the movement of the movable element 202. Therefore, the counter electromotive voltage becomes large, and the current hardly flows to the coil 205.

On the condition of the intermediate opening, in a case where the voltage value of the low-voltage source to be applied to the coil 205 is low, the current flowing to the coil 205 becomes small after the current reaches timing $t_{46}$. As a result, the counter electromotive voltage L·di/dt becomes larger than the voltage R·I of the Ohm's law. The current is not possible to be increased, and may be decreased as the current 405. In this case, on a condition that the injection pulse is short as the injection pulse 406, that is, an injection pulse width 751 of FIG. 7, a current 409 at timing when the injection pulse 406 is stopped becomes small compared to a current 410 in a case where the voltage of the low-voltage source to be applied to the coil 205 is high. Since the current is low, the magnetic attraction force applying to the movable element 202 is lowered. Therefore, a displacement 408 of the valve 214 becomes small compared to a displacement 407. As a result, the time taken for the valve 214 to be closed after starting to be opened (hereinafter, referred to as an open period) is reduced. Since the injection amount is determined by an integral value of the open period, the injection amount becomes small from an injection amount 752 to an injection amount 753 by reducing the open period.

In a case where the low-voltage source is configured by the battery voltage VB for example, a spike noise occurs at the moment when in-vehicle equipment connected to the battery voltage VB is energized. A voltage to be momentarily applied to the fuel injection device is lowered. The in-vehicle equipment is, for example, an optical source such as a head light, or a starter. In addition, even in a case where the coil 205 is heated to make the resistance increased, the current flowing to the coil 205 is reduced according to Expression (1), and the current may be reduced as the current 405.

Next, the description will be given about a control method of the fuel injection device 101 in the first embodiment using FIGS. 6 and 7.

Figure 6:
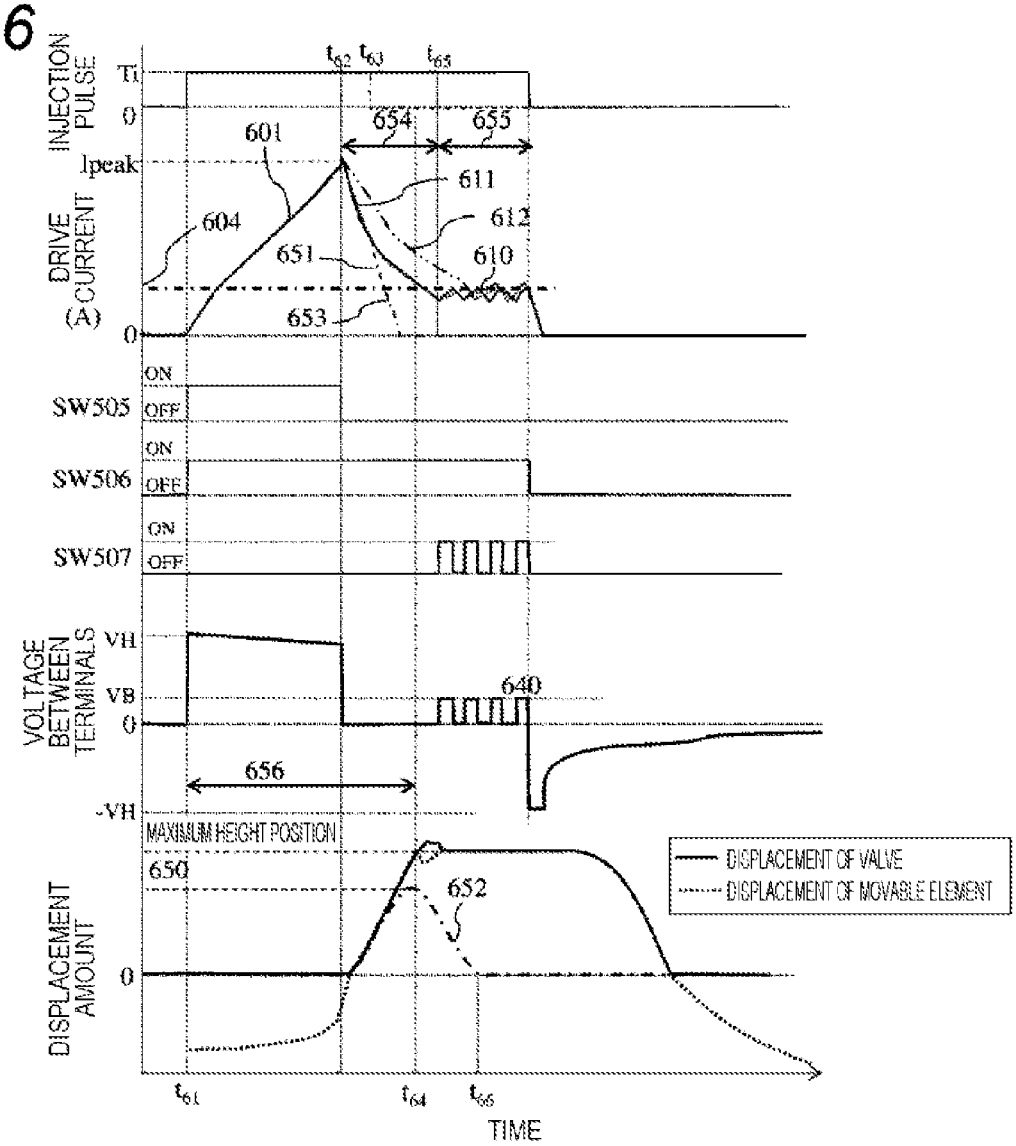
FIG. 6 is a diagram illustrating a relation between an injection pulse, a drive current to be supplied to the fuel injection device, switching elements of the fuel injection device, a voltage between terminals of a solenoid, behaviors of a valve and a movable element, and time according to a first embodiment.

FIG. 6 is a diagram illustrating a relation between an injection pulse, a drive current to be supplied to the fuel injection device 101, the switching elements 505, 506, and 507 of the fuel injection device, a voltage $V_{inj}$ between terminals of the solenoid 205, behaviors of the valve 214 and the movable element 202, and time in the first embodiment. FIG. 7 illustrates a relation between the injection pulse width and the injection amount in a case where the fuel injection device 101 is controlled by the drive current waveform of FIG. 6. Further, in FIG. 7, the injection amount characteristic in a case where the fuel injection device 101 is controlled by a drive current 601 is indicated by the injection amount Q713 with the dashed line.

First, when the injection pulse width Ti is input to the drive IC 502 through the communication line 504 at timing $t_{61}$ by the CPU 501, the switching element 505 and the switching element 506 are turned ON, the boosting voltage (predetermined voltage) VH higher than the battery voltage VB is applied to the solenoid 205, the drive current is supplied to the fuel injection device 101, and the current steeply rises at a high speed as the current 601 When the current is supplied to the solenoid 205, a magnetic attraction force is applied between the movable element 202 and the fixed core 207. The movable element 202 starts to be displaced at timing when a resultant force of the magnetic attraction force (a force in the opening direction) and the load of the second spring 212 exceeds the load of the third spring 234 (a force in the closing direction). Thereafter, after the movable element 202 runs in the gap G2, the movable element 202 comes into conflict with the valve 214. Therefore, the valve 214 starts to displace, and the fuel is injected from the fuel injection device 101.

When the current reaches the maximum current $I_{peak}$ at timing $t_{62}$, the switching element 506 is energized, and the switching element 505 and the switching element 507 are de-energizes. Almost 0 V is applied to both terminals of the fuel injection device 101 by a so-called free wheel in which the current is regenerated between a ground potential 515, the switching element 506, the fuel injection device 101, and a ground potential 516. The current is smoothly reduced as a current 611. Then, almost 0 V (or a voltage lower than the boosting voltage VH) is continuously applied to both terminals of the fuel injection device 101 until timing $t_{64}$ when the valve 214 reaches the maximum height position (full lift position). Thereafter, when it comes to timing $t_{65}$, the energization and the de-energization of the switching element 507 is switched, a first drive current 610 is controlled such that the current is held at or near a current 604. Further, a period of controlling the first drive current 610 is called a first current holding period 655.

Until timing $t_{64}$ when the valve 214 reaches the maximum height position, a current larger than the current 604 which can hold the valve 214 at the maximum height position may be supplied to the solenoid 205. In a state where the valve 214 is at a position lower than the maximum height position, there is a gap (hereinafter, referred to as a magnetic gap) between the movable element 202 and the fixed core 207. Therefore, a magnetic resistance is increased. The magnetic attraction force is lowered compared to a case where the movable element 202 contacts the fixed core 207. Therefore, a current higher than the current 604 is supplied until the movable element 202 or the valve 214 reaches the maximum height position. The valve 214 can stably reach up to the maximum height position. The timing of reaching a maximum height comes to an injection pulse width 754 earlier than an injection pulse width 755 of the related art. Since an opening delay time is shortened, a variation of an opening delay time 656 taken for the valve 214 to reach the maximum height position after the injection pulse is supplied is suppressed. A deviation of the injection amount in a case where the valve 214 reaches the maximum height position is suppressed, and the PN can be reduced. In addition, since the variation of the opening delay time 656 is suppressed, a deviation of a conflict speed when the movable element 202 comes into conflict with the fixed core 207 can be suppressed. The variation of the injection amount in the range 756 of the injection pulse width can be effectively suppressed.

In addition, when the current shifts to the first current holding period 655 after the valve 214 reaches the maximum height position, the current to be supplied to the solenoid 205 is suppressed. The power consumption of a fuel injection device 101 can be suppressed, and the effect of improving the fuel efficiency is obtained.

Next, the description will be given about a relation between a current waveform 651 and the valve 214 on the condition of a half lift in which the valve 214 is driven at a first height position 650 lower than the maximum height position. Further, the displacement of the valve 214 in a case where the current waveform 651 is used is indicated with the dashed line (displacement 652) in the drawing. When the current reaches the maximum current $I_{peak}$ at timing $t_{62}$ after the movable element 202 starts to move in the opening direction and is accelerated, the switching element 506 is energized, and the switching element 505 and the switching element 507 are de-energizes. Almost 0 V is applied to both terminals of the fuel injection device 101 by a so-called free wheel in which the current is regenerated between a ground potential 515, the switching element 506, the fuel injection device 101, and a ground potential 516. The current is reduced as a current waveform 651.

Then, when the injection pulse Ti is stopped at timing $t_{63}$, all the switching elements 505, 506, and 507 are de-energized. With the counter electromotive force caused by the inductance of the fuel injection device 101, the diode 509 and the diode 510 are energized. The current is fed back toward the voltage source VH. The current supplied to the fuel injection device 101 is steeply lowered and reaches 0 A as a current 653 rather than the current 611 in a case where the injection pulse Ti is not blocked. When the supplying of the current is stopped, the magnetic attraction force applied to the movable element 202 is lowered. At timing when the force in the opening direction of the resultant force of the magnetic attraction force and an inertia force of the second spring 212 and the movable element 202 is less than the force in the closing direction of the differential pressure applied to the first spring 210 and the valve 214, the valve 214 starts to be closed from a height position 650 lower than the maximum height position, contacts the valve seat 218 at timing $t_{64}$, and stops the injection of the fuel. In this way, almost V is continuously applied to both terminals of the fuel injection device 101 until the timing when the valve 214 reaches the height position 650 lower than the maximum height position.

In addition, the open period of the valve 214 may be controlled by controlling the timing of lowering the current to be supplied to the fuel injection device 101 by changing timing $t_{63}$ when the injection pulse Ti is stopped, and by controlling the magnetic attraction force applying to the movable element 202.

In the current control in the first embodiment, in a case where the valve 214 is driven to the maximum height position, the injection pulse is stopped in a period from timing $t_{62}$ when the maximum current $I_{peak}$ is stopped until timing $t_{65}$ when the valve shifts to the first current holding period 655 (hereinafter, referred to as a first moving period 654), so that the displacement of the valve 214 at the height position lower than the maximum height position may be controlled. After the maximum current $I_{peak}$ is stopped, the current is free-wheeled to apply 0 V to both terminals of the fuel injection device 101. Therefore, even in a case where the battery voltage instantaneously varies by the above reason, the voltage applied to the fuel injection device 101 is not changed, and the current also does not vary. Therefore, the change of the injection amount along with the variation of the battery voltage VB is suppressed, and the injection amount can be controlled with accuracy. As a result, the variation of an air-fuel mixture configured by fuel and air can be suppressed. Therefore, the variation in evenness of the air-fuel mixture can be suppressed, and the PN can be suppressed.

In addition, a constant voltage may be applied to the first moving period 654 instead of 0 V. For example, there may be provided a circuit to rectify the voltage to the boosting voltage VH so as to output the constant voltage lower than the boosting voltage VH. In the first moving period, the constant voltage is applied to the fuel injection device, so that the change of the current along with the variation of the battery voltage VB is suppressed, and the deviation of the injection amount can be suppressed. In addition, in a case where a voltage of 0 V or higher is applied to the solenoid 205 after the maximum current $I_{peak}$ is stopped, the current is smoothly reduced as illustrated with the current 612. If the voltage is too high, the time taken for the valve 214 to reach the first current holding period 655 after reaching the maximum height position becomes too long, and thus the area of the current becomes large. The power consumption of the fuel injection device 101 is increased, and thus the fuel efficiency may be worsened. Therefore, the constant voltage is desirably equal to or less than 14.5 V which is an upper limit of a generator connected to the battery voltage VB or the battery voltage VB for example. With a constant and low voltage, the PN can be reduced and the power consumption can be suppressed by suppressing the deviation of the flow amount. In addition, the first current holding period 655 is ended by blocking the injection pulse Ti, so that the timing of blocking the injection pulse Ti is controlled. Therefore, the length of the first current holding period 655 can be changed, and the open period of the valve 214 can be controlled.

In addition, in the current control in the first embodiment, in a case where the valve 214 is driven to the height position lower than the maximum height position, almost V is continuously applied to both terminals of the fuel injection device 101 until timing when the valve 214 reaches the height position 650 lower than the maximum height position. Even in a case where the battery voltage instantaneously varies, the voltage applied to the fuel injection device 101 does not vary, and the current is also not changed. Therefore, the change of the injection amount along with the variation of the battery voltage VB is suppressed, and the injection amount can be controlled with accuracy.

Next, the control device 150 of the fuel injection device 101 according to a second embodiment will be described with reference to FIGS. 8 and 9.

Figure 8:
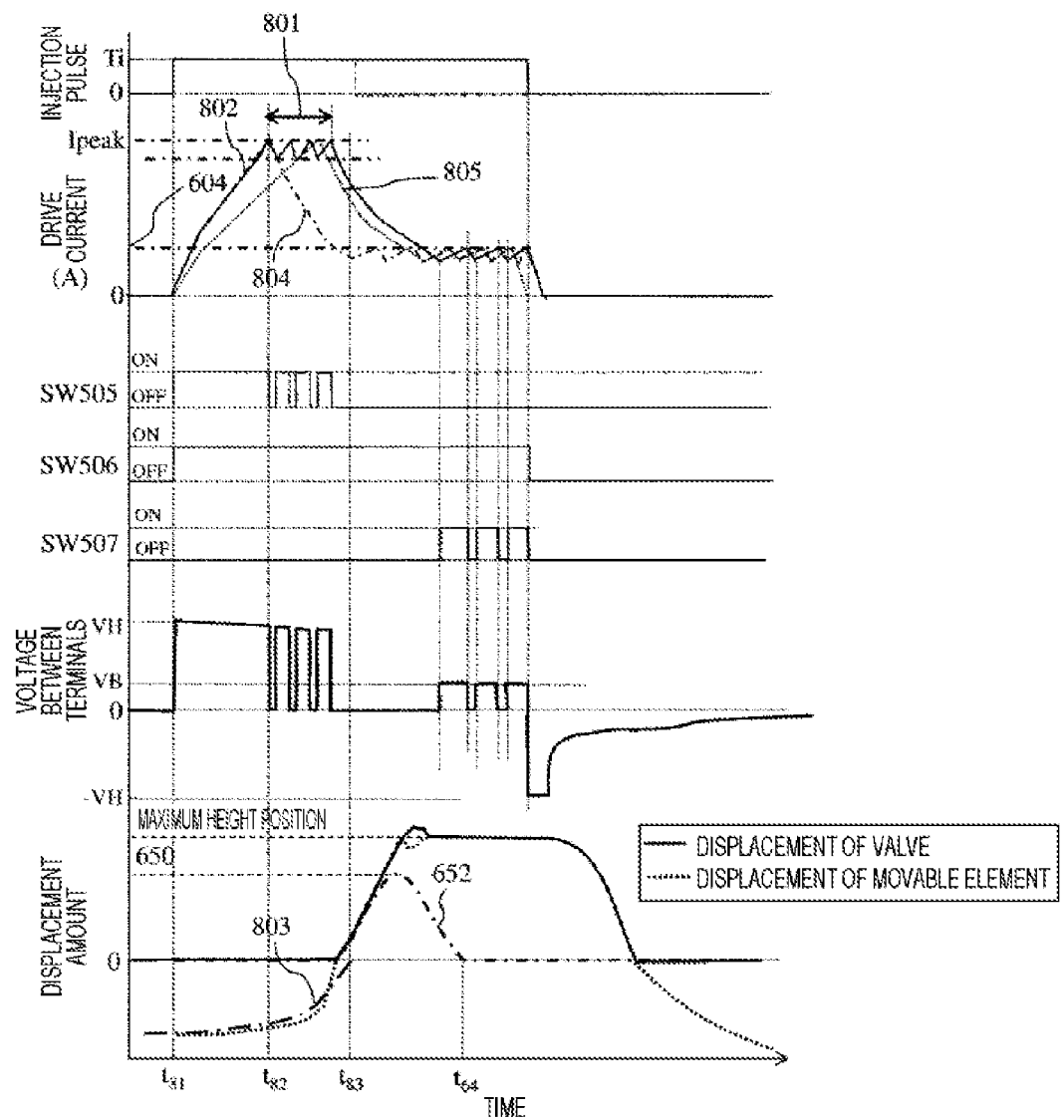
FIG. 8 is a diagram illustrating a relation between an injection pulse, a drive current to be supplied to the fuel injection device, switching elements of the fuel injection device, a voltage between terminals of a solenoid, behaviors of a valve and a movable element, and time according to a second embodiment.

FIG. 8 is a diagram illustrating a relation between an injection pulse, a drive current to be supplied to the fuel injection device 101, the switching elements 505, 506, and 507 of the fuel injection device, a voltage $V_{inj}$ between terminals of the solenoid 205, behaviors of the valve 214 and the movable element 202, and time in the second embodiment. Further, the same configurations in FIG. 8 as those of FIG. 6 will be attached with the same symbol. The drive current 601 drawn with a solid line of FIG. 6 of the first embodiment in the drive current in the drawing is illustrated as a drive current 805 with a dotted line. A drive current 804 in a case where the drive current 601 drawn with a solid line of FIG. 6 of the first embodiment is applied to the fuel injection device 101 of the second embodiment is depicted with the dashed line.

Figure 9:
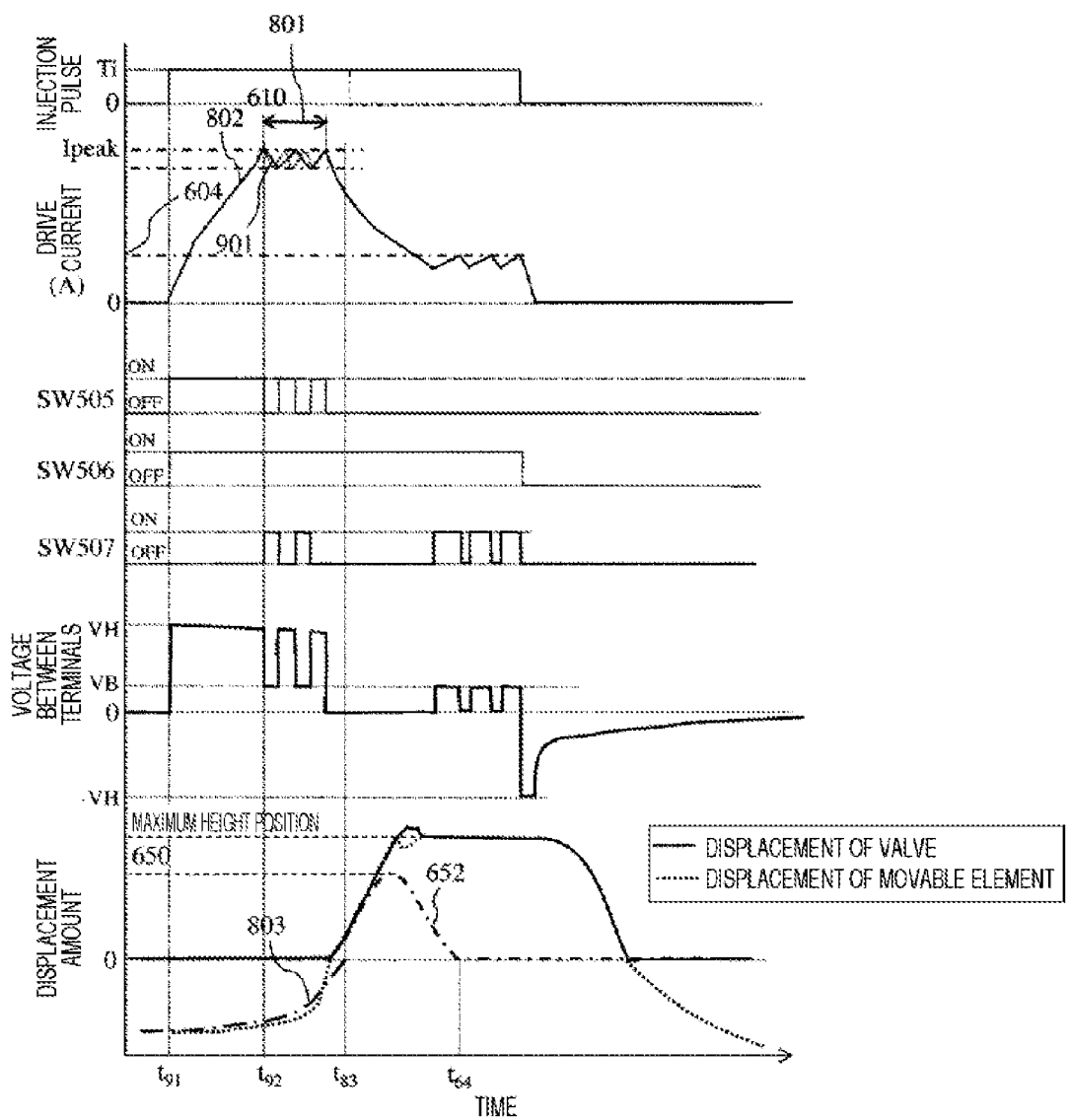
FIG. 9 is a diagram illustrating a modification of a relation between an injection pulse, a drive current to be supplied to the fuel injection device, switching elements of the fuel injection device, a voltage between terminals of a coil, behaviors of a valve and a movable element, and time according to the second embodiment.

FIG. 9 is a diagram illustrating a modification of the relation between an injection pulse, a drive current to be supplied to the fuel injection device 101, the switching elements 505, 506, and 507 of the fuel injection device, a voltage $V_{inj}$ between terminals of the coil 205, behaviors of the valve 214 and the movable element 202, and time in the second embodiment. Further, the same configurations in FIG. 9 as those of FIGS. 6 and 8 will be attached with the same symbol. A drive current 802 drawn with a solid line of FIG. 8 in the drive current in the drawing is depicted with a dotted line.

In the fuel injection device 101 of this embodiment, the resistance of the coil 205 is made small from the viewpoint of reducing the power consumption to improve the fuel efficiency, the magnetic circuit is made efficiency in order to improve the responsiveness of the movable element 202 from the viewpoint of the reduction of the opening delay time. Therefore, the inductance of the coil 205 becomes small, and the current rises earlier than the drive current 805 of the first embodiment as the drive current 804.

Then, the difference between the drive current 802 supplied to the fuel injection device 101 in this embodiment and the drive current 804 supplied to the fuel injection device 101 of the first embodiment is that there is provided a holding period 801 of the maximum current $I_{peak}$ to hold the drive current 802 within a predetermined range having the maximum current $I_{peak}$ as an upper limit after the drive current 802 reaches the maximum current $I_{peak}$.

In the fuel injection device 101 in this embodiment, when the current reaches the maximum current $I_{peak}$ at timing $t_{82}$, the switching control is performed such that the switching element 505 is energized or de-energized to repeatedly apply or stop the boosting voltage VH to the coil 205 so as to hold the drive current within a predetermined range having the maximum current $I_{peak}$ as an upper limit. The heating of the coil 205 contributes to the square of the current. Therefore, if the maximum current $I_{peak}$ is set high, the heating of the coil 205 becomes large. The resistance of the coil 205 is increased, an allowable drive current becomes small in accordance with the Ohm's law, and the injection amount may be lowered. Therefore, the maximum current $I_{peak}$ which can be set is restricted by an upper limit.

As described in this embodiment, in a case where the drive current 804 having no holding period 801 of the maximum current $I_{peak}$ is used, the current 604 in which the current can hold the valve 214 at the maximum height position at timing $t_{83}$ when the movable element 202 comes into conflict with the valve 214 is set to be lowered from the maximum current $I_{peak}$ as illustrated the displacement amount 803 of the movable element 202. The magnetic attraction force for sufficiently accelerating the movable element 202 may be not secured.

As this embodiment, if the holding period 801 of the maximum current $I_{peak}$ is provided, the energizing period of the current necessary for accelerating the movable element 202 is secured. The conflict speed when the movable element 202 comes into conflict with the valve 214 is secured. Therefore, the valve 214 can reach the maximum height position with stability. As a result, even in a case where the fuel pressure of the fuel to be supplied to the fuel injection device 101 becomes high, the operation of the valve 214 can be compensated. Therefore, the deviation of the injection amount in the high fuel pressure can be suppressed, and the effect of reducing the PN is achieved. In addition, according to this embodiment, the deviation of the conflict speed when the movable element 202 comes into conflict with the valve 214 can be suppressed. Therefore, the deviation of the kinetic energy that the valve 214 receives from the movable element 202 can be reduced. The closing delay time taken for the valve 214 to abut on the valve seat 218 and be closed after the injection pulse is stopped can be held constant. As a result, the deviation of the injection amount is suppressed, and the effect of reducing the PN is achieved.

In addition, as illustrated in FIG. 9, in the holding period 801 of the maximum current $I_{peak}$, the boosting voltage VH and the battery voltage VB, or a constant voltage may be controlled to be repeatedly applied.

In a case where the boosting voltage VH and the battery voltage VB are repeatedly applied in the holding period 801 of the maximum current $I_{peak}$, the switching element 505 is de-energized at timing $t_{92}$ when the drive current reaches the maximum current $I_{peak}$ and the switching element 507 is energized after the switching element 505 is energized to apply the boosting voltage VH. Therefore, the battery voltage VB is applied to repeatedly switch the boosting voltage VH and the battery voltage VB. By using the battery voltage VB or a constant voltage in the holding period 801, the current in the holding period 801 is gently reduced as illustrated in a current 901. As a result, the number of times of energizing and de-energizing of the switching element 505 in the holding period 801 is reduced. If the boosting voltage VH is applied to the coil 205 from the high-voltage source by repeating energizing and de-energizing the switching element 505, the heating of the boosting circuit 514 and the ECU 104 becomes large, and the current to be supplied to the coil 205 may be restricted. However, according to the control method in this embodiment, the number of times of energizing and de-energizing the switching element 505 in the holding period 801 can be reduced. Therefore, the heating of the ECU 104 can be suppressed, the drive current can be stably supplied to the coil 205, and the deviation of the injection amount can be suppressed.

In particular, the heating of the ECU 104 is critical on a condition that the vehicle speed is low and the wind hardly hits the ECU 104, and on a condition that the rotation frequency of the engine is high, the drive cycle of the fuel injection device 101 becomes fast, and the energy of the drive current to be supplied to the coil 205 is increased. Therefore, as described above, on a condition that the heating of the ECU 104 is critical, the drive current may be switched in the holding period 801 such that the application of the boosting voltage VH and the battery voltage VB or the application of a constant voltage are controlled to be repeated.

Next, the control device 150 of the fuel injection device 101 according to a third embodiment will be described with reference to FIG. 10.

Figure 10:
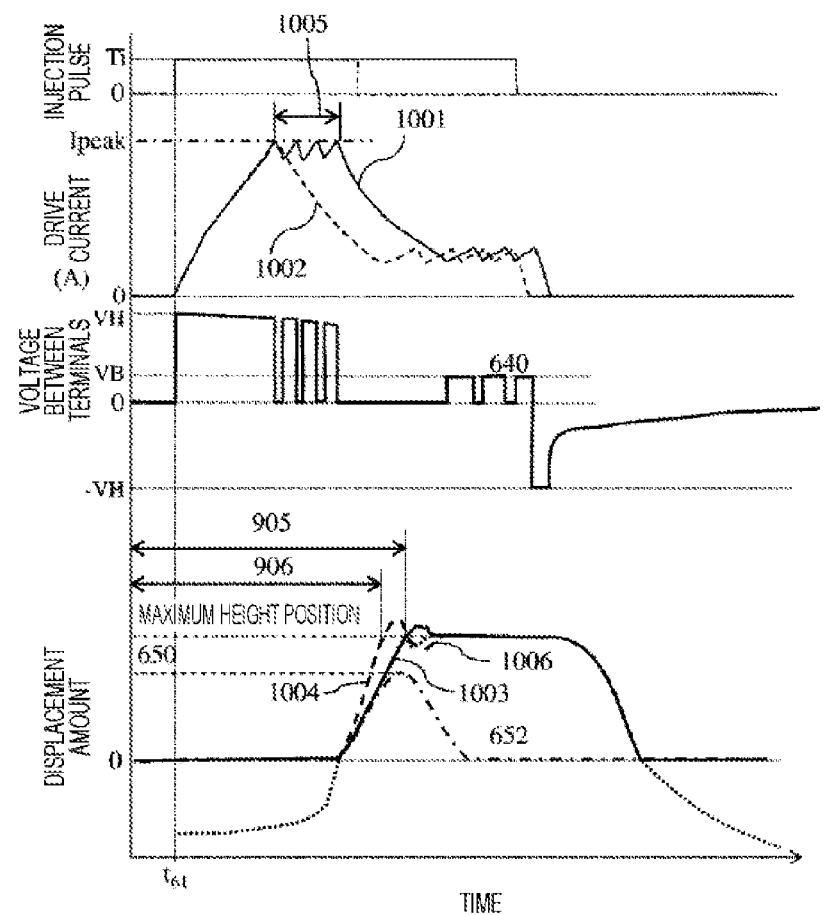
FIG. 10 is a diagram illustrating a relation between an injection pulse, a drive current to be supplied to the fuel injection device, a voltage between terminals of a coil, behaviors of a valve and a movable element, and time according to a third embodiment.

FIG. 10 is a diagram illustrating a relation between the injection pulse, the drive current to be supplied to the fuel injection device 101, the voltage $V_{inj}$ between terminals of the coil 205, behaviors of the valve 214 and the movable element 202, and time according to a third embodiment. Further, the same configurations in FIG. 10 as those of FIGS. 8 and 9 will be attached with the same symbol. In the drive current of the drawing, a drive current 1001 in a case where a holding period 1005 of the maximum current $I_{peak}$ is provided is illustrated with a solid line. A drive current 1002 in a case where the holding period 1005 of the maximum current $I_{peak}$ is not provided is illustrated with a broken line. In a case where the drive current 1001 is used, the displacement amount of the valve 214 in a case where the supplying pressure of the fuel in the fuel injection device 101 is high is illustrated with a solid line as a displacement 1003. The displacement amount of the valve 214 in a case where the supplying pressure of the fuel is low is illustrated with a broken line as a displacement 1004.

The difference between the control device 150 of the fuel injection device 101 of this embodiment and the control device 150 of the fuel injection device 101 of the first and second embodiments is that there is provided a pressure detection unit which detects a signal of the pressure sensor 102 attached to the fuel pipe 105 illustrated in FIG. 1 by the ECU 104, there is provided the holding period 1005 of the maximum current $I_{peak}$ as the drive current 1001 in a case where the pressure detected by the pressure detection unit is higher than a predetermined pressure, there is not provided the holding period 1005 of the maximum current $I_{peak}$ to hold the drive current 1002 within a predetermined range having the maximum current $I_{peak}$ as an upper limit as the drive current 1002 in a case where the pressure is lower than the predetermined pressure, and the current is controlled to be reduced when the drive current reaches the maximum current $I_{peak}$.

In a case where the drive current 1001 provided with the holding period 1005 of the maximum current $I_{peak}$ is used, and the pressure detected by the pressure detection unit is higher than the predetermined pressure, the force caused by the fuel pressure applied to the valve 214 becomes large. Therefore, an opening delay time 905 becomes long. On the other hand, in a case where the detected pressure is lower than the predetermined pressure, the force caused by the fuel pressure applied to the valve 214 becomes small. Therefore, the opening delay time 905 becomes long. The magnetic attraction force required for causing the movable element 202 and the valve 214 to reach the maximum height position becomes large as the opening delay time becomes long. On a condition that the pressure is small, the displacement of the valve 214 rises steeply as the displacement 1004 in a case where the drive current 1001 is used, and the speed when the movable element 202 comes into conflict with the fixed core 207 becomes large. Therefore, the movable element 202 bounds with respect to the fixed core 207, and an undershoot 1006 may occur in the displacement of the valve 214. If the undershoot of the valve 214 is large, the injection amount is non-linearly reduced after the valve 214 reaches the maximum height position as described in FIG. 7 of the first embodiment. Therefore, the injection amount is not linearly increased according to the injection pulse width, and the injection amount is deviated. Therefore, the PN may be increased.

According to the control device 150 of the fuel injection device 101 of this embodiment, in a case where the pressure is low, and the drive current reaches the maximum current $I_{peak}$ as the drive current 1002, the current is reduced from the maximum current $I_{peak}$. In a case where the pressure is high, the drive current 1001 provided with the holding period 1005 of the maximum current $I_{peak}$ is used to perform the switching control. Therefore, even if the fuel pressure is changed, the valve 214 can stably reach the maximum height position. The non-linearity of the injection amount after the valve 214 reaches the maximum height position can be suppressed. Both the robustness of the displacement of the valve 214 and the reduction of the deviation of the injection amount both can be achieved.

In addition, the holding period 1005 of the maximum current $I_{peak}$ in the drive current 1001 may be controlled to be long as the pressure is increased, and to be short as the pressure is reduced. Since the opening delay time is increased as the pressure becomes high, the magnetic attraction force required for opening the valve is secured by setting the holding period 1005 long, and the valve 214 can stably reach the maximum height position. Further, the relation between the pressure and the length of the holding period 1005 can be appropriately set.

In addition, the current of the maximum current $I_{peak}$ in the drive currents 1001 and 1002 may be controlled to be large as the pressure is increased, and to be small as the pressure is reduced. A fluid force applied to the valve 214 is increased as the pressure is increased, and the opening delay time is increased. Therefore, the magnetic attraction force required for opening the valve can be secured by increasing the current of the maximum current $I_{peak}$ and the valve 214 can stably reach the maximum height position.

In a case where the holding period 1005 of the maximum current $I_{peak}$ is changed according to the pressure, the length of the holding period 1005 is set according to the time calculated by the drive IC 502. Therefore, it is possible to make time resolution fine according to the drive cycle of the drive IC 502. Therefore, a fine adjustment can be made according to the pressure, and the effect of reducing the deviation of the injection amount is increased. In addition, in a case where the current of the maximum current $I_{peak}$ is changed according to the pressure, the area of current required for opening the valve can be secure by securing the current even in a case where the resistance of the coil 205 becomes small due to the heating of the coil 205. Therefore, it is possible to control the injection amount with robustness with respect to the change of the environmental condition.

Next, the control device 150 of the fuel injection device 101 according to a fourth embodiment will be described with reference to FIG. 11.

Figure 11:
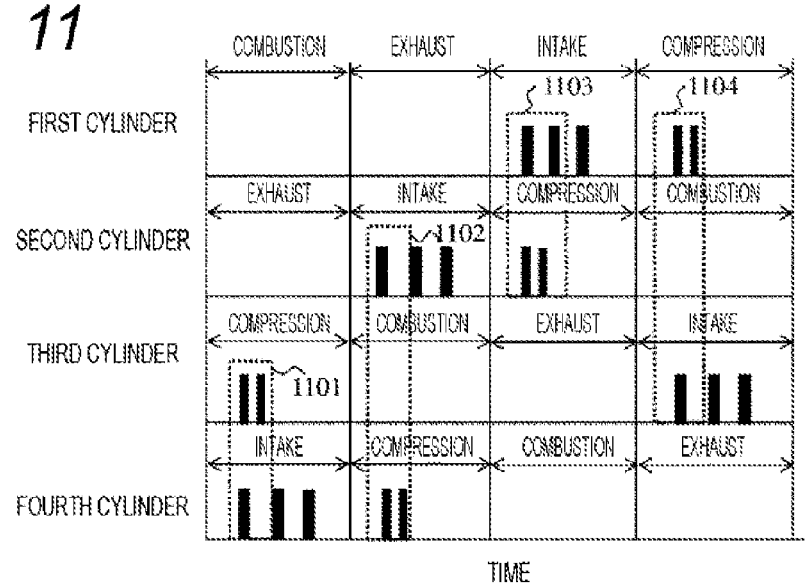
FIG. 11 is a diagram illustrating a relation between a fuel injection timing, an injection period, and time of first to fourth cylinders according to a fourth embodiment.

FIG. 11 is a diagram illustrating a relation between the fuel injection timings and the injection periods of the first to fourth cylinders, and time on a condition that the fuel is injected three times in the intake stroke and two times in the compression stroke during one combustion cycle including the intake stroke, the compression stroke, the combustion stroke, and the exhaust stroke. Further, in a case where the cylinders are defined as the first, second, third, and fourth cylinders from the front cylinder, FIG. 11 illustrates a typical inline-four engine which performs ignition in an order of the first cylinder, the third cylinder, the fourth cylinder, and the second cylinder.

The description will be given about a condition that the injection timings between the cylinders are overlapped in the beginning. In a direct injection engine, the fuel is injected in the intake stroke to form an even air-fuel mixture in the cylinders. Then, the fuel is injected in the compression stroke to make a locally-rich air-fuel mixture near the ignition plug to perform a weak stratified combustion. Accordingly, combustion control by PN suppression, where the exhaust and the fuel efficiency are both achieved may be performed. In this case, at timing 1101, the injection at the compression stroke of the third cylinder and the injection at the intake stroke in the fourth cylinder are overlapped. At timing 1102, the injection at the intake stroke of the second cylinder and the injection at the compression stroke of the fourth cylinder are overlapped. At timing 1103, the injection at the intake stroke of the first cylinder and the injection at the compression stroke of the second cylinder are overlapped. At timing 1104, the injection at the compression stroke of the first cylinder and the injection timing at the intake stroke of the third cylinder or the injection period of the fuel may be overlapped.

In a case where the boosting circuit 514 is disposed in each of the cylinders, the next injection is not likely to be requested again in a state where the high-voltage source is lowered in a case where the fuel injections at the intake stroke and the compression stroke are overlapped between the cylinders as long as the injection interval in one cylinder is secured. However, the charges accumulated in the capacitor 533 of the boosting circuit 514 are discharged when a certain time elapses. Therefore, in a case where the drive cycle of the boosting circuit 514 is delayed, the voltage of the high-voltage source may be lowered. In addition, in the four-cylinder engine, in order to reduce the heating and the cost of the ECU 104, one boosting circuit 514 may be provided for the odd-numbered (first and third) cylinders or for the even-numbered (second and fourth) cylinders, or one boosting circuit 514 may be shared for the four cylinders. By reducing the number of the boosting circuits 514, the number of transistors having a secured breakdown voltage, switching elements, capacitors which can store a high voltage is reduced. Therefore, the cost of the ECU 104 can be reduced.

In addition, in the boosting circuit 514, the switching element 531 is repeatedly turned ON/OFF at a high frequency in order to accumulate the charges in the capacitor 533. In this case, the boosting circuit 514 is heated up, and thus the time for applying the boosting voltage to the coil 205 or the current flowing to the coil 205 may be restricted. By reducing the number of the boosting circuits 514, the heating of the ECU 104 can be suppressed. In particular, even in a case where the fuel pressure supplied to the fuel injection device 101 is increased, the current control of the fuel injection device 101 can be performed without restriction of the current. As a result, the operation can be stable at a high fuel pressure, and the accuracy of the injection amount can be increased within a high fuel pressure range.

On a condition that the injection timings are overlapped with other cylinders, there may be provided a function of using the holding period of the maximum current $I_{peak}$ provided for the current control. According to the configuration of the fourth embodiment, it is possible to secure the magnetic attraction force required for opening the valve according to the holding period of the current even if the boosting voltage VH of the high-voltage source is lowered. The deviation of the injection amount in a case where the boosting voltage VH is lowered can be suppressed.

Further, for the control method of the control device 150 of this embodiment, the effect of reducing the deviation of the injection amount even when being used with the control devices 150 of the second and third embodiments in combination, as described above.

Further, the invention is not limited to the above embodiments. A person skilled in the art could easily conceive various additions and modifications within a scope of the invention.

REFERENCE SIGNS LIST 101 fuel injection device
104 ECU
150 control device
202 movable element
205 coil
214 valve
505 switching element
507 switching element
514 boosting circuit
VB battery voltage
VH boosting voltage

The invention claimed is:

1. A control device of a fuel injection device which includes a valve and a coil to generate a magnetic attraction force attracting a movable portion to drive the valve, wherein a predetermined voltage is applied to the coil on the basis of an injection pulse, a drive current flows to the coil until the drive current reaches a maximum current, and the movable portion is attracted to drive the valve to inject fuel,
the drive current flowing to the coil is lowered from the maximum current before the valve reaches a desired maximum lift position, and a constant voltage lower than the predetermined voltage or 0 V is continuously applied to the coil until the valve reaches the desired maximum lift position.

2. The control device of the fuel injection device according to claim 1,
wherein, in a case where the desired maximum lift position is a position lower than a maximum height position which is a position where the valve moves farthest,
the injection pulse is blocked in a section where the constant voltage or 0 V is applied to the coil, the drive current flowing to the coil is lowered compared to a case where the injection pulse is not blocked, and an open period of the valve is controlled to open the valve up to a position lower than the maximum height position.

3. The control device of the fuel injection device according to claim 1,
wherein the drive current flowing to the coil is lowered from the maximum current, and the drive current flowing to the coil is held within a range lower than the maximum current after the valve reaches the desired maximum lift position.

4. The control device of the fuel injection device according to claim 3,
wherein, after the drive current is held within the range lower that the maximum current, the injection pulse is blocked, the drive current flowing to the coil is set to 0 to control an open period of the valve after reaching the desired maximum lift position.

5. The control device of the fuel injection device according to claim 1,
wherein, when the drive current flowing to the coil reaches the maximum current, the voltage to be applied to the coil is caused to vary to provide a holding period in which the drive current is held within a predetermined range having the maximum current as an upper limit.

6. The control device of the fuel injection device according to claim 5, comprising:
a pressure detection unit which detects a pressure of the fuel to be supplied to the fuel injection device,
wherein, in a case where the voltage detected by the pressure detection unit is higher than a predetermined value, the holding period of the drive current is provided, and, in a case where the voltage is lower than the predetermined value, the drive current flowing to the coil is lowered from the maximum current without providing the holding period of the drive current.

7. The control device of the fuel injection device according to claim 5,
wherein each of a plurality of fuel injection devices is provided in a cylinder which performs a combustion cycle including an intake stroke, a compression stroke, a combustion stroke, and an exhaust stroke, and
in a case where fuel injection timings of one cylinder and another cylinder are overlapped, the holding period in which the drive current is held within a predetermined range having the maximum current as an upper limit is provided for the fuel injection devices corresponding to the one cylinder and the other cylinder.

8. The control device of the fuel injection device according to claim 5, comprising:
a low-voltage source; and a high-voltage source which has a voltage higher than the low-voltage source,
wherein a voltage is applied from the high-voltage source to the coil until the drive current reaches the maximum current, and
in a case where the voltage applied to the coil is varied, the coil is alternately applied with a voltage from the high-voltage source or a voltage from the low-voltage source.

9. The control device of the fuel injection device according to claim 1, comprising:
a first switching element between the fuel injection device and a ground potential; and a second switching element between the fuel injection device and the low-voltage source,
wherein, when the drive current flowing to the coil is lowered from the maximum current, the first and second switching elements are blocked.

10. The control device of the fuel injection device according to claim 1, comprising:
a pressure detection unit which detects a pressure of the fuel to be supplied to the fuel injection device, wherein, in a case where a pressure detected by the pressure detection unit is higher than a predetermined value, the current of the maximum current is increased, or the holding period in which the drive current is held within a predetermined range the maximum current as an upper limit is increased.

* * * * *